United States Patent [19]

Hayakawa et al.

[11] Patent Number: 4,653,386
[45] Date of Patent: Mar. 31, 1987

[54] WIND DIRECTION ADJUSTING MECHANISM FOR AIR CONDITIONER

[75] Inventors: Toshihiro Hayakawa; Hiroshi Sugiura, both of Toyota, Japan

[73] Assignee: Toyota Jidosha Kabushiki Kaisha, Aichi, Japan

[21] Appl. No.: 792,912

[22] Filed: Oct. 30, 1985

[30] Foreign Application Priority Data

Nov. 20, 1984 [JP] Japan ............... 59-176246[U]
Nov. 22, 1984 [JP] Japan ............... 59-177535[U]

[51] Int. Cl.⁴ .................................. F24F 13/15
[52] U.S. Cl. ........................... 98/40.28; 98/2; 98/40.24
[58] Field of Search ......... 98/2, 2.04, 40.24, 40.26, 98/40.27, 40.28, 40.3

[56] References Cited

U.S. PATENT DOCUMENTS 4,339,991  7/1982  Asano et al. ....................... 98/2

FOREIGN PATENT DOCUMENTS 2457190  1/1981  France ............................ 98/2
2468158  5/1981  France ............................ 98/2
148132   9/1982  Japan ............................. 98/2
28943    2/1983  Japan ............................. 98/2

Primary Examiner—Harold Joyce
Attorney, Agent, or Firm—Kenyon & Kenyon

[57] ABSTRACT

A wind direction adjusting mechanism for an air conditioner which has an air diffuser barrel supported to a rotational shaft to rotate in elevational or lateral directions in a bezel of a side ventilator, longitudinal or lateral blades pivotally secured in lateral or longitudinal directions in the barrel, a cam rotatably engaged with the rotational shaft, a rod engaged with the cam for operating to rotate the longitudinal or lateral blades, rotary drive means coupled with said cam, and a frictional clutch for producing a slip by a resistance of a predetermined value to couple the cam with the drive shaft. Thus, the adjusting mechanism can separately rotate the air diffusing barrel in a bezel of a side ventilator and the longitudinal or lateral blade in the barrel by a simple drive mechanism, protect the drive mechanism by the slip of the clutch when an unreasonable force is acted to the air diffuser barrel side, be associated in large degree of freedoms of designing in an instrument panel to improve the design in the compartment and provide the large defrosting function of the side window glass.

13 Claims, 9 Drawing Figures

WIND DIRECTION ADJUSTING MECHANISM FOR AIR CONDITIONER

BACKGROUND OF THE INVENTION

This invention relates to improvement in a wind direction adjusting device of an air conditioner mainly used for a vehicle.

Conventional means for removing the cloud of a side window glass for a vehicle has a side defroster duct extended from a defroster for a front window and a side defroster nozzle associated with the duct.

Another example is constructed to remove the cloud of a side window glass by a side ventilator.

A conventional device for executing the latter method has been proposed in Japanese Utility Model Laid-open No. 200,411/1982 official gazette, Japanese Utility Model Laid-open No. 179,212/1983 official gazette or Japanese Utility Model Laid-open No. 60,014/1984 official gazette.

In the structure for executing the former method with the side defroster nozzle, it has such disadvantages that the design in the compartment of the vehicle becomes wrong since the side defroster nozzle is provided in the compartment, the number of components such as the side defroster duct, the side defroster nozzle, etc., and the number of assembling steps increase, thereby resulting in an increase in the cost, and a range for removing the cloud of the window galss is narrowed because the opening area of the nozzle is small.

In the device disclosed in Japanese Utility Model Laid-open Nos. 200,411/1982 and 60,014/1984 official gazettes, the disadvantages of the structure of the former method are eliminated, but it has drawbacks that its operating mechanism increases in size and in occupying area so that a difficulty arises in the association in an instrument panel and that drive systems for a lateral blade and a longitudinal blade are separate so that a technical concept of unifying the drive systems of both is not disclosed.

In the device disclosed in Japanese Utility Model Laid-open Nos. 179212/1983 official gazette, it has such disadvantages that, when removing the cloud of a side window glass, a driver must extend his hand from a driver's seat so that the driver is difficult to operate this device.

SUMMARY OF THE INVENTION

It is, accordingly, an object of this invention to provide a wind direction adjusting device of an air conditioner for a vehicle which can eliminate the drawbacks and disadvantages of the conventional device and which can separately rotate an air diffusing barrel in a bezel of a side ventilator and a longitudinal or lateral blade in the barrel by a simple drive mechanism, protect the drive mechanism by the slip of a clutch when an unreasonable force is acted to the air diffuser barrel side, be associated in large degree of freedoms of designing in an instrument panel to improve the design in the compartment and provide the large defrosting function of the side window glass.

The wind direction adjusting mechanism of an air conditioner of this invention is constructed to support the air diffuser barrel by a rotational shaft so as to rotate in upward and downward elevational directions in a bezel of a side ventilator, engage a rod for ratating a longitudinal blade in the barrel in rightward and leftward laterla directions with a cam rotatably mounted on the shaft, couple the cam with a rotary drive unit, and couple the cam with the shaft by a frictional clutch slipping at a resistance of a predetermined value.

Thus, the cam and the rotational shaft are rotated by the single rotary drive unit to initaially rotate the air diffuser barrel, to then slip the frictional clutch when the barrel is stopped so as to rotate only the cam and to them rotate the longitudinal blade. In this manner, if a malfunction occurs in the air diffuser barrel so that the resistance such as an impossible rotation increases, the frictional clutch slips to protect the drive mechanism. In addition, the drive mechanism is simplified, and can be readily associated in the instrument panel. Further, the side defroster nozzle of the conventional device is eliminated to improve the design in the compartment of the vehicle as well as to enhance the side window defrosting function and to reduce the cost and the number of assembling steps.

Since this invention is constructed as described above, the rotational shaft coupled through the frictional clutch with the cam is rotated by rotating the cam by the rotary drive unit to rotate the air diffuser barrel by the rotation of the rotational shaft in the upward or downward direction and to rotate the longitudinal blade in the rightward or leftward direction by the cam, thereby separately rotating the air diffuser barrel and the longitudinal blad by the single rotary drive unit.

Since the cam coupled with the rotary drive unit is coupled with the rotational shaft by the frictional clutch in the invention, the rotating angle of the cam can be increased larger than that of the rotational shaft. Further, even if the rotation of the rotational shaft is blocked due to any malfunction, the cam is not damaged nor can be rotated.

Inasmuch as the drive mechanism is simplified in the invention, the degree of freedoms of designing the association of the wind direction adjusting mechanism of the invention in a narrow instrument panel can be increased. As the side defrosting function can be performed by the use of the side ventilator, the side defroster nozzle of the conventional device can be eliminated to improve the design in the compartment of the vehicle and to increase the defrosting effect as well as to reduce the number of components and assembling steps.

BRIEF DESCRIPTION OF THE DRAWINGS

The above and other related objects and features of the invention will be apparent from a reading of the following description of the disclosure found in the accompanying drawings and novelty thereof pointed out in the appended claims.

DESCRIPTION OF THE PREFERRED EMBODIMENTS

Figure 8:
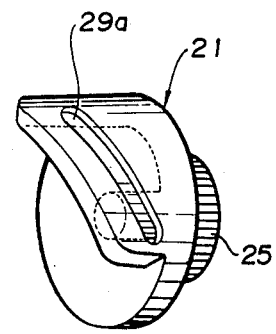
FIG. 8 is a view showing another example of a groove formed on a cam.
Figure 9:
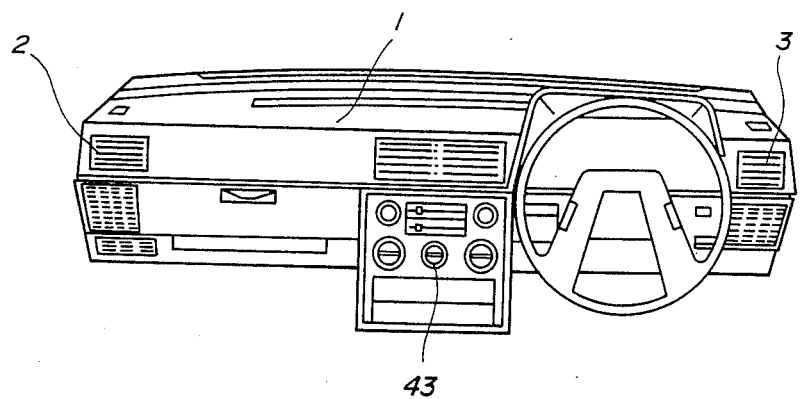
FIG. 9 is a front view showing only the instrument panel portion of a vehicle.

The present invention will now be described in detail with reference to FIGS. 1 to 9, which show an embodiment of a wind direction adjusting mechanism of an air conditioner according to the present invention, and, as shown in FIG. 9, the mechanism is applied to side ventilators 2, 3 of an instrument panel 1 of the vehicle.

Figure 1:
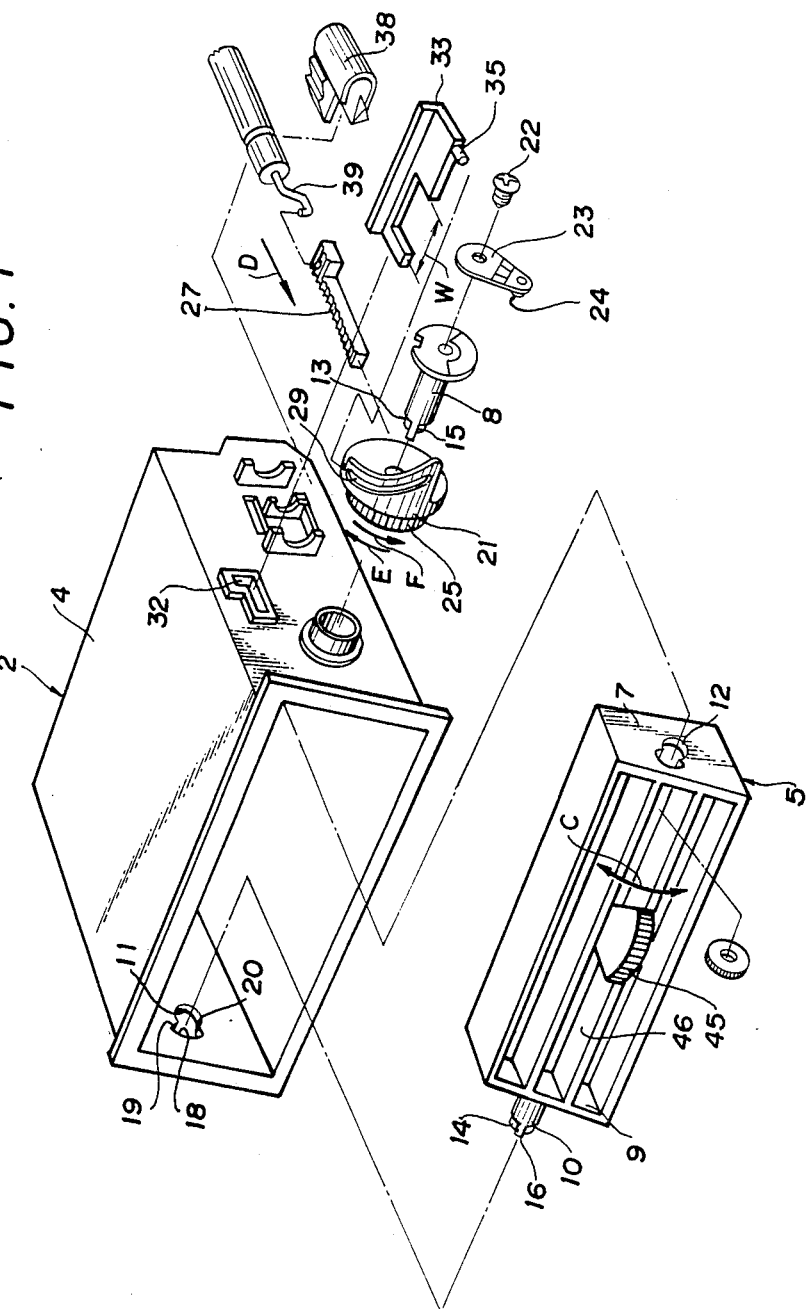
FIG. 1 is an exploded perspective view of an embodiment of a wind direction adjusting mechanism of an air conditioner for a vehicle according to the present invention.
Figure 2:
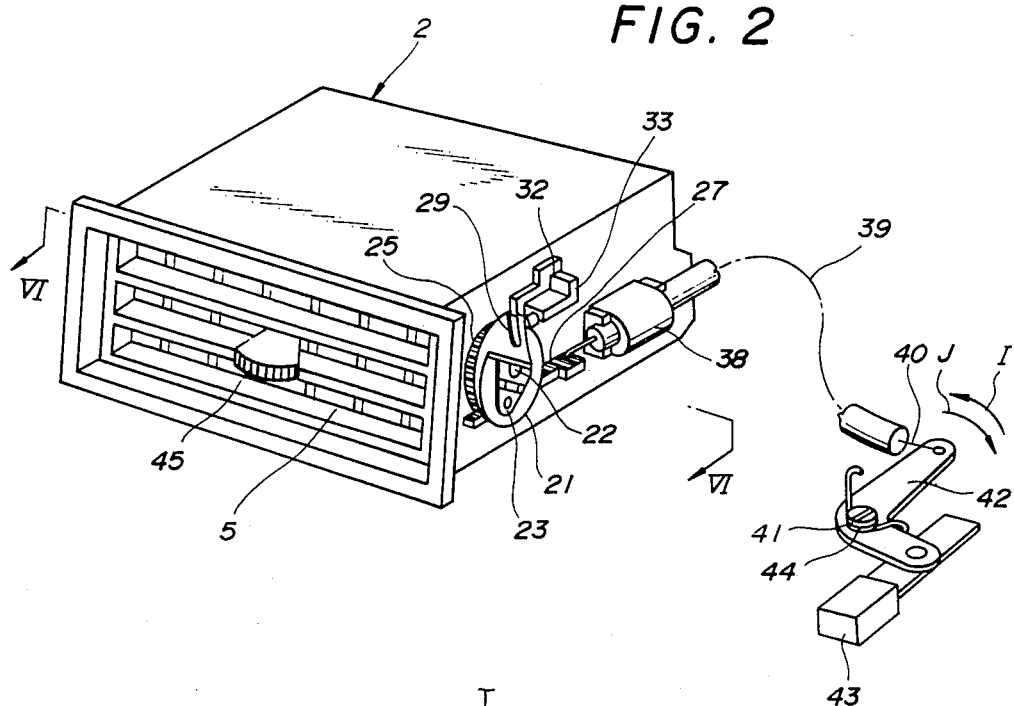
FIG. 2 is a perspective view showing the associated state of the mechanism in FIG. 1.

FIGS. 1 and 2 show the side ventilator 2, and an air diffuser barrel 5 is disposed in bezel 4. The barrel 5 has lateral blades 5a secured to the front side and longitudinal blades so supported to the barrel 5 as to be rotatable at the central portion of the upper and lower ends thereof at the rear side.

The air diffuser barrel 5 is supported rotatably in the axial opening 12 of one side wall 7 in upward and downward directions as shown by an arrow c by a rotational shaft 8 and in the axial opening 11 of the bezel 4 by a shaft 10 secured to the other side wall 9.

Figure 4:
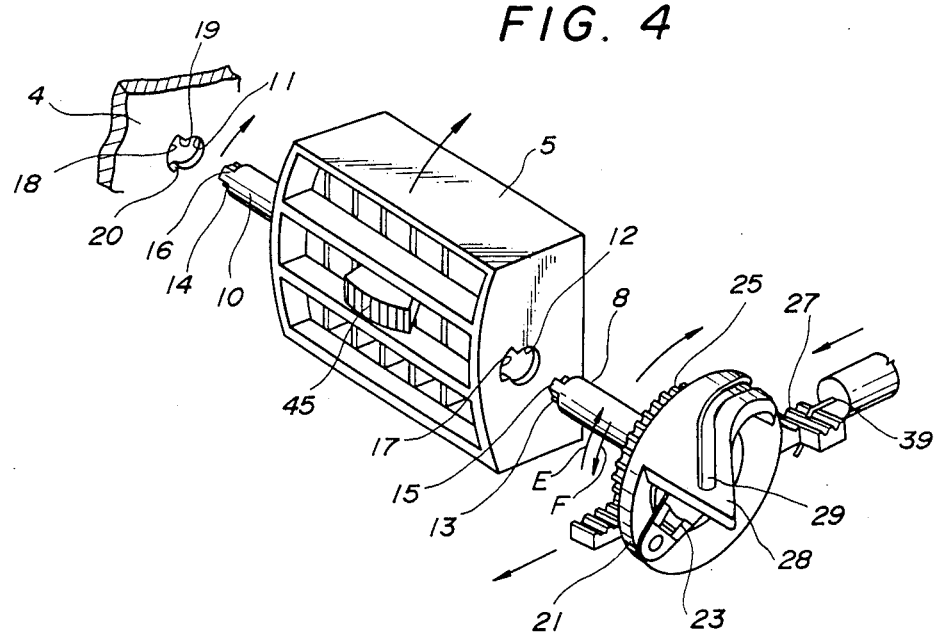
FIG. 4 is an exploded perspective view of an air diffuser barrel and its rotary drive mechanism.

The shafts 8 and 10 have, as shown in FIG. 4, radially projecting parts 15 and 16 on a reduced-diameter portions 13 and 14, respectively and arcuate grooves 17 and 18 which are longer than the arcuate lengths of the projecting parts 15 and 16, respectively are formed on the outer peripheral surfaces of the axial openings 11 and 12, respectively to be engaged with the reduced-diameter portions 13 and 14, respectively in the axial openings 11 and 12, respectively. thus, the both ends 19 and 20 of the groove 18 of the axial opening 11 are formed as stoppers for restricting the upper and lower limits of the rotation of the barrel 5 in cooperation with the projecting part 16 of the shaft 10.

A cam 21 is engaged with the shaft 8, and coupled with the shaft 8 by a frictional clutch 23 made of a leaf spring material secured by a screw 22 to the end of the shaft 8.

Figure 3:
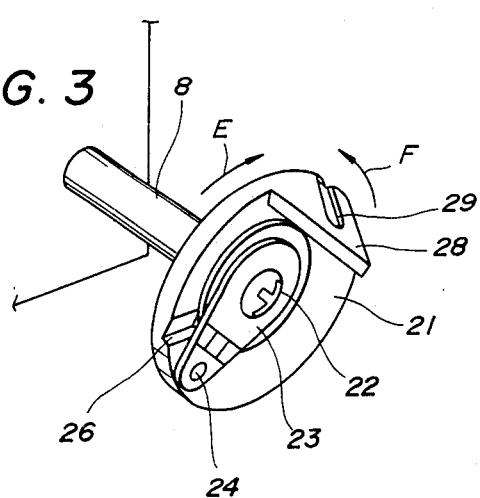
FIG. 3 is a perspective view showing a cam and a frictional clutch of the mechanism.
Figure 7:
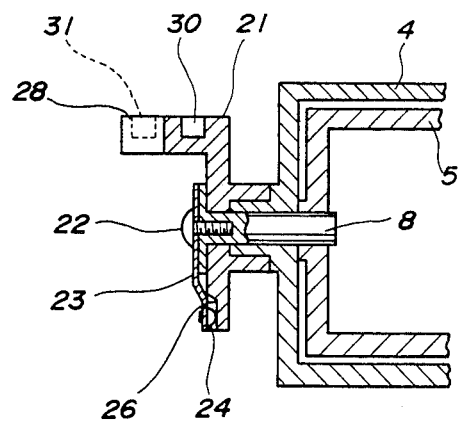
FIG. 7 is an enlarged sectional view, taken along the line VII—VII in FIG. 5.

The associating structure of the shaft 8, the cam 21 and the clutch 23 is as shown in FIGS. 3 and 7. The clutch 23 secured by the screw 22 to the end of the shaft 8 is coupled in such a manner that a projection 24 formed at the end of the clutch 23 on one side surface of the clutch 23 is engaged elastically of the leaf spring elasticity of the clutch 23 with a V-shaped groove 26 formed on one side surface of the cam 21, thereby transmitting the rotary force from the cam 21 side to the shaft 8 as will be described in detail. However, if a resistance larger than the spring elasticity of the clutch 23 is applied to the shaft 8 side since the clutch 23 is constructed as a frictional clutch, the clutch 23 is elastically deformed as shown in FIG. 3 so that the projection 24 is forcibly displaced out of the groove 26. Thus, the cam 21 is disengaged from the shaft 8, and only the cam 21 becomes rotatable.

A pinion gear 25 is concentrically secured with the cam 21. On the other hand, a rack 27 to be engaged in mesh with the pinion gear 25 is disposed telescopically in the direction of arrow E along the outer wall of the bezel 4 to rotate the cam 21 in the directions of arrows E and F by the telescopic movements of the rack 27.

The cam 21 is formed with a peripheral extending portion 28 extended acially outwardly from the outer periphery of the cam 21, and fromed with a cam groove 29 made on the outer peripheral surface of the extending portion 28 thereof. The cam groove 29 is formed with a first cam groove portion 30 made in parallel with the telescopic direction of the rack 27, and a second cam groove portion 31 continued to the first cam groove 30 and gradually separated outwardly.

A rod 33 for ratating the longitudinal blade 6 is telescopically engaged within a window opening 32 of the outer wall of the bezel 4.

Figure 5:
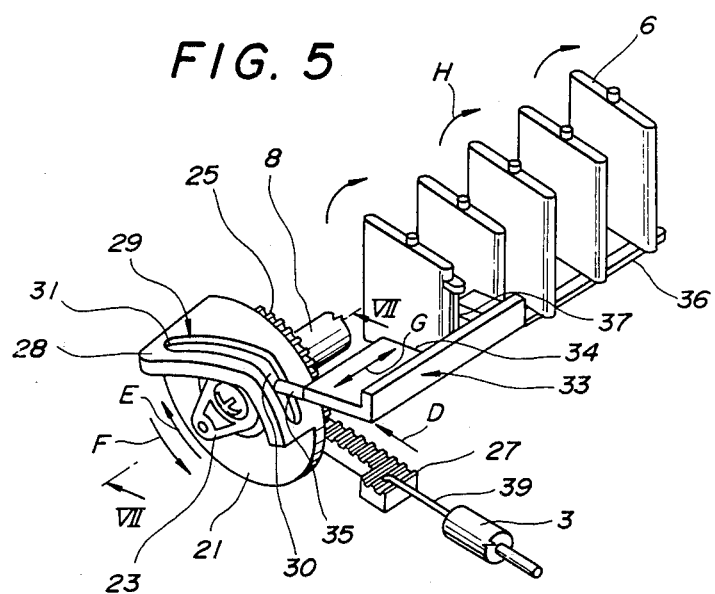
FIG. 5 is a perspective view showing longitudinal blades and its rotary drive mechanism.
Figure 6:
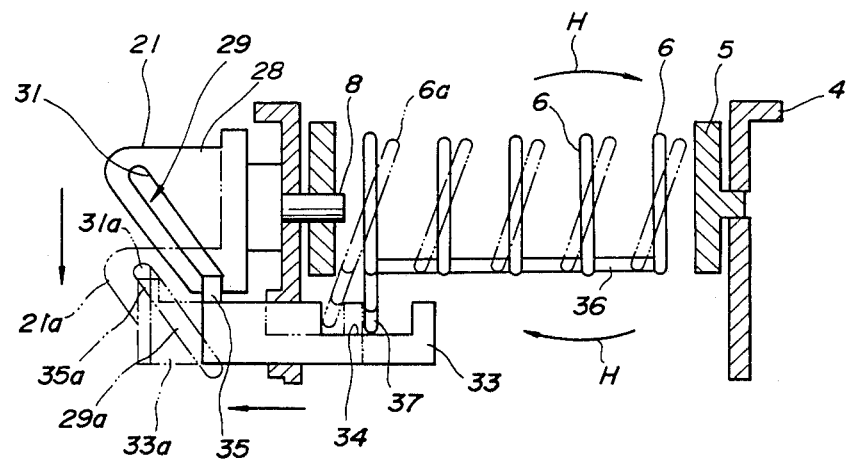
FIG. 6 is a sectional view, taken along the line VI—VI of FIG. 2.

The rod 33 is engaged, as apparently shown in FIGS. 5 and 6, with one of the longitudinal blades 6 at a rectangular cutout portion 34 opened at one lateral side at the position longitudinally displaced from the longitudinal center line, and with the cam groove 29 of the cam 21 at a projection 35 projected from the one lateral side face at the position of the longitudinal one end thereof. When the cam 21 is rotated, the rod 33 is telescopically moved in the directions of arrows G through the engagement of the projections 35 with the cam groove 29 having the first and second cam groove portions 30 and 31. Thus, the longitudinal blades 6 which are coupled cooperatively by a connecting rod 36 are pivotally turned at the respective center lines in the direction as designated by arrows H.

The longitudinal width W of the cutout portion 34 of the rod 33 is formed remarkably wider than the width of a contacting portion 37 formed at the lower side of one of the blades 6, disposed at the cam 21 side, and formed, as shown in FIGS. 5 and 6, so that, when the projection 35 of the rod 33 engaged with the cam groove 29 moves from the first cam groove portion 30 to the second cam groove portion 31 of the cam 21, the blades 6 are turned in the direction of the arrows H, while when the projection 35, on the contrary, moves from the second groove portion 31 to the first groove portion 30, the blades 6 are not affected by any action.

A cable 39 which is guided by a clamp 38 secured to the outer wall of the bezel 4 is fixed, as shown in FIGS. 1 and 2, at the end thereof to the rack 27, and the rack 27 is telescopically moved back and forth by the telescopic movements of the cable 39.

The rear end 40 of the cable 39 is engaged with one end of an L-shaped bell-crank 42 pivotally secured by a screw 41 to the operating position of the instrument panel 1 at the center remotely from the side ventilator 2, and the bell-crank 42 is disposed to telescopically move the rack 27 in the directions of the arrow D (FIG. 1) to pivotally turn in the directions of arrow I and J (FIG. 2) by the operations of a push switch 43 disposed at the center of the instrument panel 1 and a return spring 44 engaged with the screw 41 and the bell-crank 42, the push switch 43.

FIG. 8 shows another example of the groove of a cam formed on the cam. The groove 29a is formed on the peripheral edge along the outer edge in the shape separated gradually externally from the air diffuser barrel 5 side.

The longitudinal blades 6 can be gradually rotated by way of the groove 29a of the cam 21.

The operation of the embodiment described above will now be described. The side ventilator 2 of left side will operate as below when the air diffuser barrel 5, the longitudinal blades 6 and the rotational shaft are disposed at the neutral position to remove the cloud of the side window glass of left upper side. When the push switch 43 is initially pressed to rotate the bell-crank 41 in the direction of the arrow I, the cable 39 moves toward the cam 21, the rack 27, in turn, moves toward the cam 21, the cam 21 integral with the pinion gear 25 rotates in the direction of the arrow E, and the shaft 8 rotates in the direction of the arrow E together with the cam 21 by the operation of the frictional clutch 23. Then, the projecting part 15 of the shaft 8 makes contact with the upper edge of the arcuate groove 17 of the axial opening 12 of the barrel 5, the shaft 8 thus rotates, the air diffuser barrel 5 thus rotates obliquely upwardly with respect to the bezel 4, the shaft 10 of the barrel 5 simultaneously rotates with the barrel 5, the projecting part 16 makes contact with the end 19 of the stopper at the upper side of the arcuate groove 18 of the axial opening 11 of the bezel 4, and the barrel 5 thus stops rotating.

When the barrel 5 stops rotating as described above, the shaft 8 also stops rotating, but the rotating angle of the cam 21 and hence the pinion gear 25 at this time is selected in the length of the rack 27 and the shape of the cam groove 29 to a range that the projection 35 of the rod 33 is disposed in the first cam groove portion 30 of the cam groove 29.

As described above, the pinion gear 25 and the rack 27 continue rotating by the forward movement of the rack 27 even after the shaft 8 stops rotating as described above. Thus, the frictional clutch 23 is elastically deformed so that the projection 24 of the clutch 23 is disengaged from the V-shaped groove 26 of the cam 21, as shown in FIG. 3, and the cam 21 is moved forward in the direction of the arrow E.

As a result, as shown in FIG. 6, the projection 35 of the rod 33 moves from the first cam groove portion 30 to the second cam groove portion 31 of the cam groove 29, and the cam 21, the cam groove 29, the rod 33 and the projections 35 are all disposed at the positions designated by 21a, 29a, 33a and 35a. Thus, the rod 33 moves outwardly, the longitudinal blades 6 simultaneously rotate in the direction of the arrows H to the positions 6a, the diffused wind is directed toward the side diffusing direction to be set to the state for removing the cloud of the side window glass.

The shape of the first cam groove portion 31 and the length of the rack 27 as well as the operating range of the push switch 43 are set so that the following rotating angle of the cam 21 and hence the pinion gear 25 becomes the range that the rod 33 may rotate the respective longitudinal blades 6 at the set maximum rotating angle.

As described above, when the depression of the push switch 43 is released after the rotations of the barrel 5 and the blades 6 are completed, the switch 43 is returned to the original position by the elastic tension of the return spring 44, the rack 27 is moved back, and the pinion gear 25 and the cam 21 are returned to the original positions before operating reversely in the direction of the arrow F. Thus, the rod 33 having the projection 35 and the shaft 8 are similarly returned to the original positions, but the return of the shaft 8 is performed by the cooperation of the shaft 8 with the cam 21 by the operation that the projection 24 of the clutch 23 is engaged within the V-shaped groove 26 of the cam 21 in the midway of the return of the cam 21. However, since the length of the arcuate groove 17 of the axial opening 12 of the barrel 5 is longer than that of the projecting part 15 of the shaft 8, the projecting part 15 merely moves in the arcuate groove 17 by the returning rotation of the shaft 8 to the original position by selecting the length of the arcuate groove 17, but can be set so as not to affect any motion to the barrel 5.

Further, the width W of the cutout portion 34 of the rod 33 is selected as described above so as not to inerfere with the contacting portion 37 of the blade 6. Thus, the blades 6 rotated as described above are not reversely rotated by the returning rotation of the cam 21.

In addition, since gaps are provided between the arcuate groove 17 of the axial opening 12 of the barrel 5, the shaft 8 and the projecting part 15, and between the cutout portion 34 of the rod 33 and the contacting portion 37 of the blade 6, the barrel 5 and the blade 6 can be freely manually set at the positions within the range of the gaps even after the barrel 5 and the blades 6 are rotated as described above. Therefore, the barrel 5 is returned to the neutral position by the manual operation, and the blades 6 are returned to the neutral positions by the manual operation of a lever 45.

If an accident that a foreign material is engaged with the barrel 5 in the midway of rotating the barrel 5 by rotating the shaft 8 by the rotation of the cam 21 so that the rotation is blocked occures, the projection 24 of the clutch 23 is disengaged from the V-shaped groove 26 of the cam 21, and only the cam 21 is rotated, and no damage accordingly occurs in the driving system.

In the embodiment described above, the air diffuser barrel 5 rotates in the upward and downward directions and the longitudinal blades 6 rotate in rightward and leftward directions. However, this invention is not limited to the particular embodiment. For example, the barrel 5 may rotate in the rightward and leftward direction, and the later blades instead of the longitudinal blades may rotate in upward and downward directions.

According to the present invention as described above, the cam coupled with the rotary drive unit transmits the rotation to the rotational shaft through the frictional clutch which slips by the resistance of a predetermined value and rotates the air diffuser barrel in the bezel of the side ventilator. Therefore, the invention can provide an effect of preventing the damage of the rotary drive unit by the slip of the frictional clutch in case that a malfunction occurs at the air diffuser barrel side so that an unreasonable force is acted thereon.

Further, according to the present invention as described above, there is provided an advantage that the air diffuser barrel and the longitudinal blades in the barrel can be remotely operated by a simple mechanism, and can be associated in the instrument panel with large degree of freedoms of design.

In addition, since the cloud of the side window glass can be removed by the side ventilator, the invention has an advantage that the cloud removing performance can be largely improved.

Moreover, since the side defroster nozzle of the conventional device can be eliminated, the design in the compartment of the vehicle can be not only improved but the numbers of components and assembling steps can be reduced to remarkably decrease the manufacturing cost.

What is claimed is:

1. A wind direction adjusting mechanism for an air conditioner, the mechanism comprising:
   a bezel forming a framelike outlet for an air conditioner duct;
   an air diffuser barrel disposed within the bezel, the barrel having a peripheral wall defining an air flow passage having a flow axis, a first set of spaced apart fixed diffuser blades extending across the flow passage parallel to a first cross-sectional axis of the barrel, and a second set of spaced apart diffuser blades, each blade of the second set being pivotally secured to the peripheral wall and extending across the flow passage parallel to a second cross-sectional axis that is substantially perpendicular to the first axis;

means for coupling the air diffuser barrel to the bezel for limited pivotal movement about said first cross-sectional axis;

means for simultaneously pivoting each of the second set of blades with respect to the flow axis of the air diffuser barrel, wherein the improvement comprises:

a single control means for adjusting both the pivot angle of the air diffuser barrel about said first axis and the pivot angles of the second set of blades with respect to said flow axis, said single control means including rotary drive means mounted on the bezel;

means coupling the rotary drive means to the air diffuser barrel for pivoting the barrel about the first axis in response to rotation of the drive means;

a cam member fixed to the rotary drive means for rotation therewith;

a cam follower coupling the means for simultaneoulsy pivoting each of the second set of blades to the cam member for pivoting said second set of blades in response to rotation of the cam member; and means for selectively actuating the drive means to rotate in one of a first direction and a second direction, opposite to the first direction.

2. A wind direction adjusting mechanism according to claim 1 wherein the means coupling the rotary drive means to the air diffuser barrel comprises a friction clutch having a torque resistance of a predetermined value to permit angular slippage between the rotary drive means and the air diffuser barrel.

3. A wind direction adjusting mechanism according to claim 1 wherein the means for coupling the air diffuser barrel to the bezel comprises a first shaft having a first end secured to the outside of the peripheral wall of the barrel and a second end, the first shaft being coaxial with the first axis and the second end of said first shaft being pivotally supported in an opening in the bezel; and the means coupling the rotary drive means to the air diffuser barrel comprises a second shaft having a first end fixed to the friction clutch and a second end, a bushing mounted in a side wall of the bezel opposite said opening for rotatably supporting the second shaft coaxially with the first shaft, and the second end of the second shaft extending into an opening in the peripheral wall of the air diffuser barrel coaxial with the first axis and opposite to the location of the first shaft for pivotally supporting the air diffuser barrel for limited rotation with respect to the second shaft.

4. A wind direction adjusting mechanism according to claim 3 wherein the second ends of said first shaft and said second shaft are each formed with a reduced-diameter portion and a radially projecting portion, the opening in the peripheral wall of the barrel and the opening in the bezel are formed with radially extending slots for receiving the respective radially projecting portions, the angular extent of each slot being greater than the angular extend of the corresponding radially extending portion by predetermined amounts for restricting the angle of rotation of the second shaft with respect to the barrel and the angle of rotation of the first shaft with respect to the bezel.

5. A wind direction adjusting mechanism according to claim 2 wherein said friction clutch comprises a spring member having a first portion and a second portion spaced from the first portion, a screw securing the first portion of the spring member to the first end of the first shaft, the rotary drive means having a clutch-engaging surface, and the second portion of the spring member being urged into frictional contact with said clutch-engaging surface.

6. A wind direction adjusting mechanism according to claim 5 wherein the second portion of the spring member comprises a projection, and the clutch-engaging surface of the rotary dirve means includes a detent depression for receiving said projection such that the projection will disengage from the detent depression only when a torque greater than a predetermined value is exerted between the rotary drive means and the first shaft.

7. A wind direction adjusting mechanism according to claim 1 wherein said rotary drive means comprises a pinion gear mounted concentrically on said first shaft, a rack in meshing engagement with said pinion gear, a push-pull cable having a first end coupled to the rack and a second end, and a drive mechanism connected to the second end of the cable for axially translating said cable.

8. A wind direction adjusting mechanism according to claim 7 wherein the drive mechanism comprises a bell-crank having a first arm connected to the second end of the push-pull cable and a second arm, a push switch connected to the second arm for rotating the bell-crank in one direction, and a return spring for urging the bell-crank in an opposite direction.

9. A wind direction adjusting mechanism according to claim 1 wherein the cam member comprises a cylindrical outer surface having a cam groove formed therein, said cam groove having a first cam groove portion extending parallel to a plane that is perpendicular to said first cross-sectional axis and a second cam groove portion extending obliquely from the first cam groove portion in a direction away from said bezel.

10. A wind direction adjusting mechanism according to claim 1 wherein the bezel has an outer wall formed with a window opening adjacent to the rotary drive means; the cam follower comprises a rod extending through the window opening, the rod having a first end formed with a projection engaging said cam member; and means for coupling the rod to said second set of blades.

11. A wind direction adjusting mechanism according to claim 20 wherein the means for coupling the rod to said second set of blades comprises an edge portion of the rod having a cutout section that accommodates an edge portion of one of said second set of glades, such that rotation of the rotary drive means causes axial movement of the rod in response to engagement of said rod projection with said cam member and thus rotating said one of the second set of blades; and wherein the means for simultaneoulsy pivoting each of the second blades comprises a connecting rod coupled to each blade.

12. A wind direction adjusting mechanism according to claim 11 wherein the length of the cutout section of said rod is substantially greater than the thickness of the edge portion of said one of the second set of blades, such that the second set of blades is provided with a predetermined amount of angular play within said cut-out section.

13. A wind direction adjusting mechanism according to claim 1 further comprising a lever connected to the second set of blades and extending forward through the first set of blades to permit manual movement of the second set of blades through a predetermined angle independently of said cam follower.

* * * * *

UNITED STATES PATENT AND TRADEMARK OFFICE
CERTIFICATE OF CORRECTION

PATENT NO.    : 4,653,386
DATED         : 31 March 1987
INVENTOR(S)   : HAYAKAWA et al.

It is certified that error appears in the above-identified patent and that said Letters Patent is hereby corrected as shown below:

| Column | Line | |
|---|---|---|
| Abstract | 16,17: | change "is acted" to --is applied--. |
|  | 17,18: | change "be associated in large degree of freedoms of designing in" to --permit a large degree of freedom in designing--. |
| 1 | 29 : | change "galss" to --glass--. |
| 1 | 45 : | change "so that the driver is" to --thus making it--. |
| 1 | 57 : | change "is acted" to --is applied--. |
| 1 | 58,59: | change "be associated in large degree of freedoms of designing in" to --permit a large degree of freedom in designing--. |
| 1 | 66 : | change "ratating" to --rotating--. |
| 1 | 68 : | change "laterla" to --lateral--. |
| 2 | 5 : | initailly" to --initially--. |
| 2 | 8 : | change "them" to --then--. |
| 2 | 10 : | delete "such as an impossible" and insert --to--. |

UNITED STATES PATENT AND TRADEMARK OFFICE
CERTIFICATE OF CORRECTION

PATENT NO. : 4,653,386

DATED : 31 March 1987

INVENTOR(S) : HAYAKAWA et al.

It is certified that error appears in the above-identified patent and that said Letters Patent is hereby corrected as shown below:

| Column | Line | | |
|---|---|---|---|
| 2 | 27 | : | change "blad" to --blade--. |
| 2 | 37 | : | change "freedoms of" to --freedom in--. |
| 2 | 37,38 | : | change "association" to --incorporation--. |
| 3 | 26 | : | between "on" and "reduced-" delete "a". |
| 3 | 29 | : | after "respectively" insert --,--. |
| 3 | 31 | : | after "respectively" insert --,--. |
| 3 | 32 | : | after "respectively" insert --,--. |
| 3 | 33 | : | change "thus" to --Thus--. |
| 3 | 47 | : | delete "of" and insert --by--. |
| 3 | 66 | : | delete "acially" and insert --axially--. |
| 3 | 67 | | delete "fromed" and insert --formed--. |
| 4 | 6 | : | delete "ratating" and insert --rotating--. |

UNITED STATES PATENT AND TRADEMARK OFFICE
CERTIFICATE OF CORRECTION

PATENT NO. : 4,653,386

DATED : 31 March 1987

INVENTOR(S) : HAYAKAWA et al.

It is certified that error appears in the above-identified patent and that said Letters Patent is hereby corrected as shown below:

| Column | Line | |
|---|---|---|
| 4 | 9 | : delete "apparently shown" and insert --is apparent--. |
| 5 | 68 | : delete "affect" and insert --impart--. |
| 6 | 2, 3 | : change "inerfere" to --interfere--. |
| 6 | 17 | : delete "an" and insert --by--; delete "that"; delete "is" and insert --becomes--. |
| 6 | 18 | : delete "midway" and insert --course--. |
| 6 | 20 | : after "blocked" delete "occures". |
| 6 | 30 | : change "later" to --lateral--. |
| 6 | 41 | : change "is acted" to --acts--. |
| 6 | 46 | : delete "associated", insert --incorporated--. |
| 6 | 47 | : change "freedoms" to --freedom--. |
| 7 | 25,26 | : delete "simultaneoulsy", insert --simultaneously--. |

UNITED STATES PATENT AND TRADEMARK OFFICE
CERTIFICATE OF CORRECTION

PATENT NO.  : 4,653,386
DATED       : 31 March 1987
INVENTOR(S) : HAYAKAWA et al.

It is certified that error appears in the above-identified patent and that said Letters Patent is hereby corrected as shown below:

| Column | Line | | |
|--------|------|---|---|
| 7 | 67 | : | change "extend" to --extent--. |
| 8 | 16 | : | change "dirve" to --drive--. |
| 8 | 54 | : | change "20" to --10--. |
| 8 | 57 | : | change "glades" to --blades--. |
| 8 | 62 | : | delete "simultaneoulsy" and insert --simultaneously--. |

Signed and Sealed this

Twenty-ninth Day of December, 1987

*Attest:*

DONALD J. QUIGG

*Attesting Officer*  *Commissioner of Patents and Trademarks*